Figure 1:
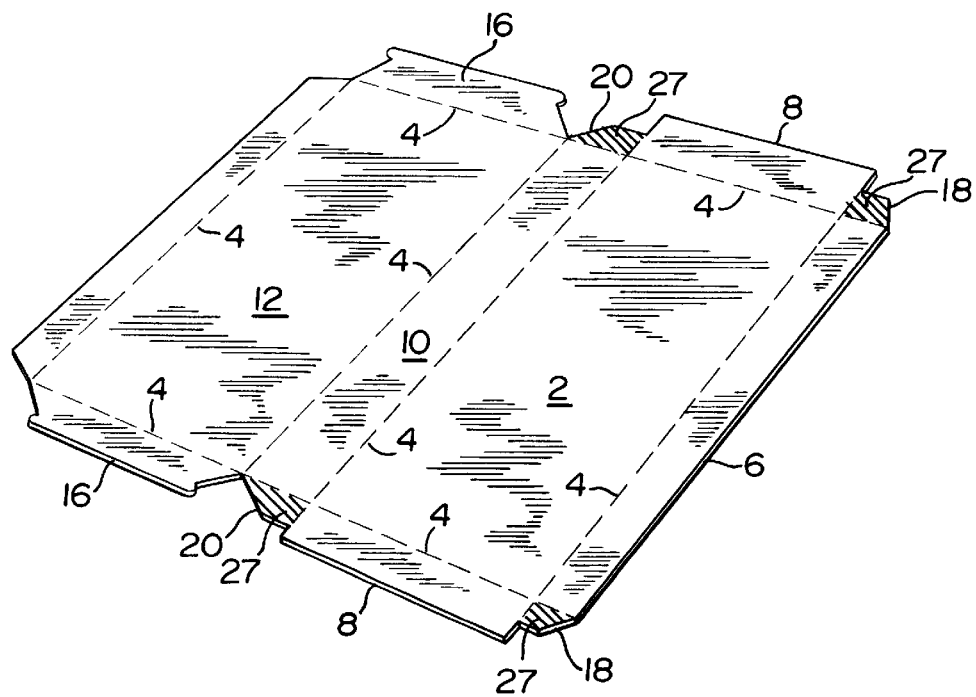

United States Patent
Nielsen

[19]

[11] Patent Number: 6,065,602
[45] Date of Patent: *May 23, 2000

[54] METHOD AND A BLOCK CARTON BLANK FOR THE LINING OF FREEZING FRAMES

[75] Inventor: Mogens Nielsen, Risskov, Denmark

[73] Assignee: Cartolit ApS, Arhus N, Germany

[*] Notice: This patent is subject to a terminal disclaimer.

[21] Appl. No.: 09/000,209

[22] PCT Filed: Aug. 5, 1996

[86] PCT No.: PCT/DK96/00335

§ 371 Date: Feb. 4, 1998

§ 102(e) Date: Feb. 4, 1998

[87] PCT Pub. No.: WO97/06064

PCT Pub. Date: Feb. 20, 1997

[30] Foreign Application Priority Data

Aug. 4, 1995 [DK] Denmark ................................. 0879/95

[51] Int. Cl.⁷ .................................................. B65D 85/00

[52] U.S. Cl. .................................. 206/459.1; 206/459.5; 229/187; 229/194

[58] Field of Search ............................. 206/459.5, 459.1, 206/525.1; 229/186, 187, 190–194; 40/359; 283/114

[56] References Cited

U.S. PATENT DOCUMENTS

| | | | |
|---|---|---|---|
| 3,257,065 | 6/1966 | Bowman et al. | 229/31 |
| 3,687,353 | 8/1972 | Prystup et al. | 229/186 |
| 4,340,169 | 7/1982 | Webinger | 229/190 |
| 4,552,268 | 11/1985 | Lee | 206/459.1 |
| 4,872,555 | 10/1989 | Shadrach, III et al. | 206/459 |
| 5,042,653 | 8/1991 | Ems | 206/247 |
| 5,244,145 | 9/1993 | Forbes, Jr. | 229/125.35 |
| 5,803,351 | 9/1998 | Nielsen . | |

*Primary Examiner*—M. D. Patterson
*Assistant Examiner*—Shian T. Lam
*Attorney, Agent, or Firm*—Nixon Peabody LLP

[57] ABSTRACT

When placing block carton linings in freezing frames it is important that the existing corner flaps (20, 27) on the carton insertion are placed externally on the adjoining side panels (8), so that they cannot be frozen when sticking into the material filled into the lined freezing frame. During a fast mounting of the block carton it may be difficult to perceive whether these corner flaps are placed inwardly or outwardly of the adjoining carton sides, since they visibly will become indistinguishable in relation to the surroundings. By the invention this will be changed, so that the inwardly facing sides of the corner flaps (20, 27) are made with a surface characteristic, e.g. a distinct signal colour, which is deviating in such a way from the outlook of the rest of the inside of the carton, that a faulty placing of the corner flaps will be discovered instantly by sight.

3 Claims, 1 Drawing Sheet

METHOD AND A BLOCK CARTON BLANK FOR THE LINING OF FREEZING FRAMES

The invention concerns a method in connection with mounting block cartons in freezing frames and a block carton blank suited for this purpose, and by the invention there is aimed at improving the certainty for a correct mounting of these cartons in the frames. The invention has close relation to the invention indicated in WO 96/02422 published on Feb. 1, 1996, why reference is made to the problem indicated therein.

In short this concerns the use of the so-called block cartons for lining of freezing frames for receiving a fresh food material, e.g. of fish, which is desired to be frozen for creating an intermediate product in the shape of semi-sized, frozen blocks which are forwarded to factories for further processing. The block cartons are constituted of simple carton blanks, that are prepared with folding lines in such a way that they have a bottom panel corresponding to the size of the freezing frames and from this projecting side wall panels, which by the mounting of a carton blank in a freezing frame are naturally raised to upright positions along the inner sides of the frame. Normally, one of the longitudinal side panels are extended in a lid panel, which after the filling of the carton lining in the freezing frame may be swung inwardly over the filling, which in this way will be covered by carton on all side faces of the block. Thereafter the individual units are conveyed to freezing in a freezer of the shelf type, after which they may be knocked out of the freezing frames and stacked for shipment, presently with the carton wall panels as intermediate layers for preventing a total freezing together and besides that the carton blanks by themselves are totally stabilized by their freezing attachment to the frozen filling blocks. For the same reason the block cartons may be prepared without any special locking means in that they are supported and kept in place by their sideway abutment against the surrounding freezing frame and against a fixed bottom plate, respectively, and partly by the block freezing itself. Thereby the block cartons only have a few main features in common with the more commonly known, self-supporting carton packings with corner flap locks and glue joints.

It is desirable that corner flap extensions appear in connection with the side wall panels of the block cartons, which may be swung outwardly or rather inwardly at the corners for creating a blocking against an instant liquid and material leakage from the filling material through the corners of the block carton raised in the freezing frame. It is important that these corner flaps are folded inwardly to a position at the outside of the abutting side wall panel, in that a position at the inside may or will cause the corner flap to be more or less protruding into the frozen filling material, which makes the further processing of it very difficult.

While it is described in the embodiment in WO 92/02422 and corresponding U.S. Pat. No. 5,803,351, how it may be detected by a preceding colour marking of parts of the carton blank whether the inwardly folded part are correctly placed as seen from the outside of the final product, e.g. at the recipient of the products, the present invention focuses particularly on the discovery of faulty mountings even on the assembly stage.

On this stage it will apply, that the operator has a view to the inner side of the mounted block carton and thereby he may also easily ascertain whether the corner flaps are correctly folded indwardly, that is to say that if they according to the present invention are made with an inwardly facing surface marking, that makes them visually different from the inside of the adjoning side wall panels. Hereby the operator may readily perceive whether a corner flap is wrongly placed, so that this fault may be corrected already before the commencement of the filling of material to be frozen, i.e. by a primary control at the supplier.

This perception by the operator may principally be substituted by an automatic surveillance system, which optically inspects the internal outlook of the mounted block cartons and activates an alarm when internal corner areas with appearing fault indication markings are detected as an indication of corner flaps appearing at the inside and not at the outside in the raised carton lining.

Figure 2:
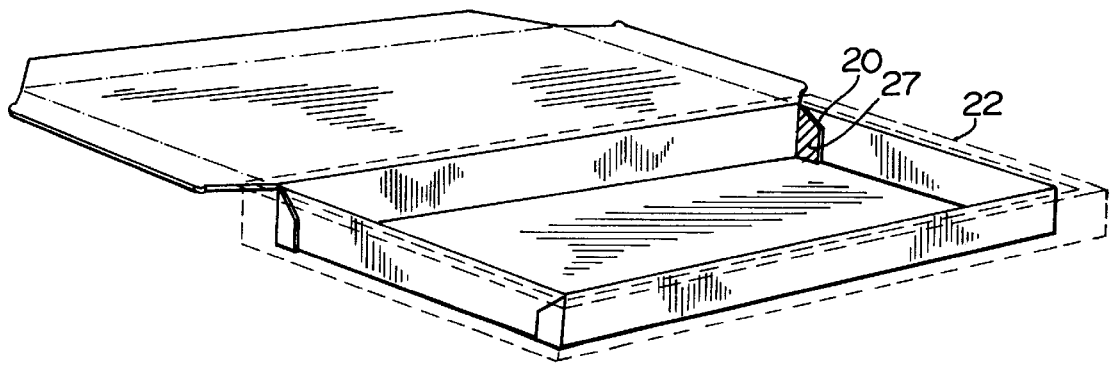

The invention will be explained in the following with reference to drawing, where FIG. 1 is an elevated perspective view of the inner side of a signal carton blank with corner flaps according to the invention, and FIG. 2 is a perspective view of a not correctly situated signal carton blank in a freezing frame.

FIG. 1 shows a perspective view of the inside of a carton blank corresponding to that described in WO 96/02422. As it appears from the figure the corner flaps 18, 20 are provided with markings 27, which in case of incorrect placing of the carton blank as lining in a freezing frame 22 will be visible from the inside, compare FIG. 2.

In case of correctly placed corner flaps 18, 20 on the outer side of the carton lining facing the freezing frame 22, the markings 27 will be covered by the raised side panels 8.

These markings can very well be used in addition to such markings, which according to WO 96/02422 are used for a corresponding external check of the finished block products.

I claim:

1. A method of mounting block cartons in freezing frames, comprising the steps of:
   inserting an unsecured carton blank into a freezing frame with side wall panels and end wall panels of the carton blank supported extending upwardly from a bottom panel of the blank by the freezing frame and with a corner flap which projects from an edge of one of said side wall panels and end wall panels folded into a position lying against an adjacent other one of said end wall panels and side wall panels at each corner; and
   inspecting the inserted carton blank to determine whether any corner flap has been positioned between the freezing frame and the wall panel against which it lies prior to filling of the blank with freezing material;
   wherein each corner flap has a side which is exposed within the freezing frame only if the corner flap is improper folded so that the wall panel against which it lies is outward of the corner flap relative to the freezing frame; wherein said side of the corner flap is provided with a surface appearance characteristic which is visually distinguishable from the appearance of the wall panels of the blank; and wherein said inspecting step is performed by examining the inserted carton blank and determining whether said surface characteristic is exposed within the freezing frame.

2. A block carton lining a freezing frame, said carton comprising a bottom panel to which side wall panels and end wall panels are connected in an upwardly erected manner and with a corner flap which projects from an edge of one of said side wall panels and end wall panels, said corner flap being folded into a position lying against an adjacent other one of said end wall panels and side wall panels in an unsecured manner at each corner; wherein each corner flap has a side which is exposed within the carton, with the side walls erected and solely supported by the freezing frame, only if the corner flap is improperly folded so that the wall panel against which it lies is outward of the corner flap relative to the freezing frame; wherein said side of the corner flap is provided with a surface appearance characteristic which is visually distinguishable from the appearance of the wall panels of the blank so that exposure of said surface characteristic forms a means for determining improper placement of the corner flap within the carton.

3. Block carton according to claim 2, wherein said surface appearance characteristic is one of a marking and a coloration.

* * * * *